United States Patent [19]
Ritter

[11] Patent Number: 5,458,867
[45] Date of Patent: Oct. 17, 1995

[54] PROCESS FOR THE CHEMICAL PREPARATION OF BISMUTH TELLURIDE

[75] Inventor: Joseph J. Ritter, Mt. Airy, Md.

[73] Assignee: The United States of America as represented by the Secretary of Commerce, Washington, D.C.

[21] Appl. No.: 303,693

[22] Filed: Sep. 9, 1994

[51] Int. Cl.[6] .......................... C01B 19/04; C01G 29/00; C22C 28/00
[52] U.S. Cl. ............................ 423/509; 423/87; 420/579
[58] Field of Search ...................... 423/509, 87; 420/579; 136/238, 240, 201; 419/38, 58

[56] References Cited

U.S. PATENT DOCUMENTS

| | | | |
|---|---|---|---|
| 2,747,231 | 5/1956 | Reinhardt | 419/38 |
| 2,788,382 | 4/1957 | Faus et al. | 136/5 |
| 2,893,831 | 7/1959 | Bither | 23/50 |
| 2,928,733 | 3/1960 | Wagner | 419/58 |
| 3,017,446 | 1/1962 | Goldsmid et al. | 136/5 |
| 3,026,175 | 3/1962 | Kulifay | 423/509 |
| 3,058,802 | 10/1962 | Kulifay | 423/509 |
| 3,258,427 | 6/1966 | Rupprecht | 136/238 |
| 3,306,701 | 2/1967 | Anderson et al. | 423/509 |
| 3,485,757 | 12/1969 | Shapiro | 136/238 |
| 4,143,207 | 3/1979 | Itakura et al. | 428/539 |
| 4,489,742 | 12/1984 | Moore et al. | 136/201 |
| 4,576,634 | 3/1986 | Badesha et al. | 423/509 |
| 4,588,520 | 5/1986 | Jayadev et al. | 420/579 |
| 5,006,505 | 4/1991 | Skertie | 505/1 |
| 5,246,504 | 9/1993 | Ohta et al. | 136/201 |

OTHER PUBLICATIONS

"The Thermoelectric Limit ZT–1: Fact or Aritfact", Cronin B. Vining, Proceedings of the 1992 1st National Thermogenic Cooler Conference, Sep. 17, 1992.
"Materials for Thermoelectric Refrigeration", F. D. Rosi, B. Abeles and R. V. Jensen, J. Phys. Chem. Solids, Pergamon Press, 1959, no month vol. 10, pp. 191–200.
"Thermoelectric Refrigeration", H. J. Goldsmid, Plenum Press, New York, 1964, p. 11, no month.
"Compound Tellurides and Their Alloys for Peltier Cooling—A Review", Solid State Electronics, Pergamon Press, vol. 15, 1972, no month, pp. 1121–1138, Yim, W. M., et al.
"Phonon Scattering by Ultrafine Particulates in SiGe Alloys at High Temperatures", J. W. Vandersande, J. P. Fleurial, C. B. Vining J. Beaty, J. Rolfe & P. Klemens, Springer Series in Solid–State Sciences, vol. 112, Springer Verlag, Berlin, 1993, pp. 44–45, no month.
"Nuclear Resonances in Metals: Nuclear Magnetic Resonance and Mossbauer Effect", I. D. Weisman, L. J. Swartzendruber & L. H. Bennett, Techniques of Metals Research, 6, Part 2, John Wiley, New York, N.Y. 1973, pp. 464–465, no month.

(List continued on next page.)

Primary Examiner—Steven Bos
Attorney, Agent, or Firm—Jacobson, Price, Holman & Stern

[57] ABSTRACT

A process for producing bismuth telluride including dissolving tellurium to form a first solution; heating the first solution to approximately 70° C.; stirring the first solution; slowly and quantatively adding an amount of bismuth trioxide ($Bi_2O_3$) to produce a Bi/Te second solution wherein the ratio of Bi: Te=2:3; cooling the second solution to approximately 25° C.; preparing a solution of concentrated aqueous ammonia and distilled water; adding the solution of aqueous ammonia and distilled water dropwise to the second solution at approximately 25° C. to form a third solution; rapidly stirring the third solution to produce a precipitate therefrom; separating the precipitate from the third solution by centrifugation; washing the separated precipitate in distilled water; drying the washed precipitate in air to produce a $Bi_2Te_3O_9 \cdot xH_2O$, where x=1, precursor powder; heating predetermined quantities of the dried precursor powder to 250° C.–275° C., and exposing the heated precursor powder to flowing hydrogen at 1 atmosphere pressure for a period in the range of 3 to 12 hours to produce a final black powder of bismuth telluride.

8 Claims, 2 Drawing Sheets

OTHER PUBLICATIONS

"Magnetic Properties of Iron/Silica Gel Nanocomposites", R. D. Shull, J. J. Ritter, A. J. Shapiro, L. J. Swartzendruber, L. H. Bennett, Mater. Res. Soc. Symp. Proc. 132, pp. 179–184, 1989, no month Materials Research Society.

"The Effect of Quantum Well Structures on the Thermoelectric Figure of Merit", L. D. Hicks & M. S. Dresselhaus, Dept. of Physics, Mass. Inst. of Tech., Oct. 10, 1992, Phys. Rev. B, 47, 1993, pp. 1–13.

"Bi–Sb Alloys for Magneto–Thermoelectric and Thermomagnetic Cooling", W. M. Yim & A. Amith, RCA Laboratories, Princeton, N.J., Solid State Electronics 15, 1972, pp. 1141–1165, no month.

"Adsorption of Gases in Multimolecular Layers", S. Brunauer, P. Emmett & E. Teller, J. Amer. Chem. Soc. 60, 304, 1938, pp. 309–319, no month.

Joint Committee on Powder Diffraction Standards (JCPDS) Inorganic, vol. PDIS–15i RB, pattern #15–863, JCPDS, Swathmore, Pa., 1972, no month, p. 1069.

PROCESS FOR THE CHEMICAL PREPARATION OF BISMUTH TELLURIDE

BACKGROUND OF THE INVENTION

This invention relates to a process for the preparation of bismuth telluride and bismuth telluride composite thermoelectric materials. More particularly, this invention is in a method for the molecular chemical preparation of bismuth telluride and bismuth telluride composite thermoelectric materials by a chemical process.

It has been found that chlorofluorocarbon (CFC) refrigerants are detrimental to the environment and therefore a planned phase-out of CFC refrigerants may be imminent. As a result, considerable interest has developed in alternative refrigeration and cooling technologies. It is possible that alternatives to CFC liquid-gas expansion systems such as solid-state thermoelectric devices might readily be developed into a substantial technology in the near future.

Thermoelectric cooling devices based upon the Peltier effect have been used for many years in specialized applications. At the present time, these units do not achieve the performance currently available with CFCs. Typically, CFC systems operate near 40% of Carnot efficiency while the best thermoelectric systems reach only about 10% of Carnot efficiency (Vining, C. B., Proceedings of the 1992 1st National Thermogenic Cooler Conference, Fort Belvoir, Va., Sep. 17, 1992). Poor performance of the thermoelectric materials is a significant contributing factor to the low efficiency.

Certain semiconductor materials, particularly bismuth telluride-based alloys, are the materials of choice in modern thermoelectric coolers. These alloys are commonly made through metallurgical melt processing, i.e. by co-melting appropriate amounts of the pure elements in sealed vessels at temperatures above 600° C., mixing, and then subjecting the melts to controlled cooling (F. D. Rosi, B. Abeles and R. V. Jensen, "Materials for Thermoelectric Refrigeration", J. Phys. Chem. Solids, Pergamon Press 1959, Vol. 10, pp. 191–200). This batch processing approach is both equipment and labor intensive, while thermoelectric elements cut from the solidified alloys tend to be somewhat fragile. An alternative approach, amenable to automated production, is the fabrication of thermoelectric elements from polycrystalline powders (Goldsmid, H. J. Thermoelectric Refrigeration, Plenum Press, New York, 1964, p. 198; Schreiner, H. and Wendler, F., Z. Metallk, 1961, 52, 218). These powders are commonly obtained by comminuting solidified melts and classifying the resultant particulate material. Polycrystalline thermoelectric elements offer improved structural integrity, although they generally exhibit some degradation in thermoelectric performance due to the anisotropic nature of the material. Alloying is done to optimize thermoelectric performance, and is limited to elements in Groups IV, V and VI in the periodic table because it is dependent upon the wide-range, solid-solid solution properties of the components.

The method for evaluating the performance of a thermoelectric material is the determination of its figure-of-merit, Z. The figure-of-merit is defined as, $Z=S^2/\rho K$, where S is the thermopower (Seebeck coefficient), $\rho$, the electrical resistivity and K, the thermal conductivity (Goldsmid, H. J., "Thermoelectric Refrigeration" Plenum Press, New York 1964, p. 11)

Early work by Rosi, Abeles and Jensen, supra. and W. M. Yim and F. D. Rosi ("Compound Tellurides and Their Alloys for Peltier Cooling—A Review", Solid State Electronics, Pergamon Press, Vol 15, 1972, pp. 1121–1138) suggests that for semiconductors, arrays of dislocations at phase boundaries, submicroscopic precipitates, and distortions in the lattice structure would be effective in scattering phonons, but ineffective in scattering electrons which have relatively longer wavelengths. A recent report indicates a 15 to 30% reduction in the thermal conductivity of SiGe alloys through the inclusion of nanosized, BN and $Si_3N_4$ particles ("Phonon Scattering by Ultrafine Particulates in SiGe Alloys at High Temperatures", J. W. Vandersande, J. P. Fleurial, C. B. Vining, J. Beaty, J. Rolfe and P. Klemens, Springer Series in Solid-State Sciences, Vol. 112, Springer Verlag, Berlin, 1993, pp. 44–45). This selective scattering phenomenon could be used to improve the figure-of-merit for thermoelectric materials by decreasing their thermal conductivities, K, while leaving their electrical resistivities, $\rho$, essentially unchanged.

The background technology recited above from the cited publications is incorporated herein by reference.

BRIEF SUMMARY OF THE INVENTION

It is an object of this invention to overcome the environmental problems associated with the use of CFC refrigerants by providing a method for the production of materials useful in alternative devices such as solid-state thermoelectric devices.

It is a further object of this invention to provide a method for the production of bismuth telluride and bismuth telluride related materials for use in thermoelectric devices.

It is a still further object of this invention to provide a new chemical process for the production of bismuth telluride and bismuth telluride related materials for use in thermoelectric devices as alternatives to CFC refrigerants.

The invention accomplishes the above objectives by a chemical process including the synthesis of nano-particle bismuth telluride at 250° C.–275° C. having a homogeneity intrinsic to solution processing. This invention offers the potential for the incorporation of a wide range of nanosized inclusions which can be engineered to improve or modify the thermoelectric performance of the material.

As an initial step towards the chemical preparation of polycrystalline Bi—Te-based thermoelectric materials, this invention provides a novel chemical synthesis of the parent compound, bismuth telluride, $Bi_2Te_3$. This method provides a simple, two-step process for the preparation of fine-particle bismuth telluride, with a homogeneity intrinsic to solution processing. The process features the coprecipitation of a bismuth telluride precursor in aqueous media followed by its conversion to $Bi_2Te_3$ through hydrogen reduction. Precursor powder can be produced continuously on a production scale, by conducting the co-precipitation reaction in a chemical flow reactor. (Ritter, J. J., Kelly, J. F., Newbury, D. E. and Minor, D. B., National Institute of Standards and Technology Special Publication 804, Proc. Int'l Conf. on: The Chemistry of Electronic Materials, Jackson, Wyo. 08-17-22-90, Peter Davies and R. S. Roth eds., 1991, 123).

In the process of this invention, a bismuth telluride precursor is typically synthesized by preparing a bismuth/tellurium solution by dissolving tellurium in nitric acid at a temperature of about 70° C. stirring the solution, and providing an efficient fume hood in which this phase is performed since toxic nitrogen oxides are released in the process. After tellurium dissolution is complete an amount of bismuth trioxide quantitatively calculated to produce a desired ratio of bismuth and tellurium is slowly added. The clear, colorless Bi/Te solution is cooled to 25° C. A solution of concentrated aqueous ammonia and distilled water is added dropwise to the Bi/Te solution at 25° C. with rapid stirring to produce a resultant fine, white precipitate which is separated by centrifugation and thoroughly washed with distilled water and dried. Weighed quantities of this dried precursor power are heated at a predetermined temperature and pressure in flowing hydrogen for a predetermined time to produce the resultant bismuth telluride in the form of a black powder.

BRIEF DESCRIPTION OF THE DRAWINGS

The invention will now be described in detail with reference to the accompanying drawings wherein.

DETAILED DESCRIPTION OF THE INVENTION

A consideration of the reaction chemistry relevant to the co-precipitation of Bi and Te in accordance with this invention leads to the proposition that the white precursor is most likely a hydrated, very intimate mixture of bismuth and tellurium oxides. Chemical analysis is consistent with the formulation, $Bi_2Te_3O_9xH_2O$, where $x=1$. Alternatively, the more complex formulation $Bi_2Te_3O_y(OH)_2 \cdot xH_2O$, is also a possibility and cannot be ruled out entirely. However, for either formulation, the end result of chemical reduction by hydrogen will be bismuth telluride.

A schematic representation of the two-step chemical process for the simplest case is given below.

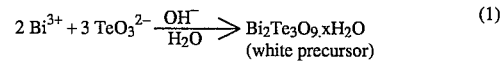
(1)

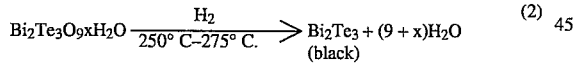
(2)

Figure 1:
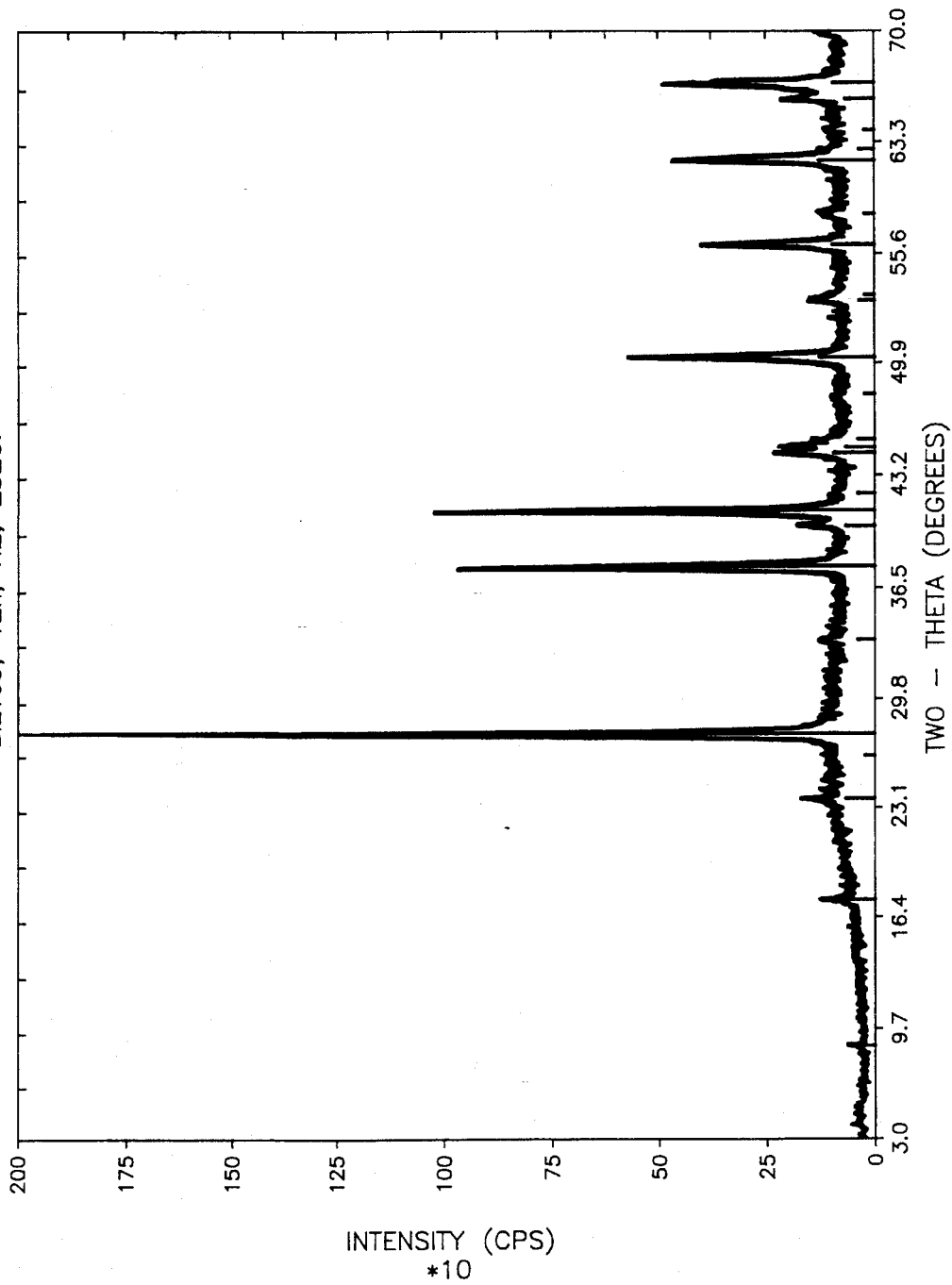
FIG. 1 is a graph showing X-ray powder diffraction of the bismuth telluride black powder produced by the process of this invention.

X-ray powder diffraction was used to confirm that the resultant black powder is bismuth telluride as shown in FIG. 1 (Joint Committee on Powder Diffraction Standards (JCPDS) Inorganic, Vol. PDIS-15i RB, pattern #15-863, JCPDS, Swathmore, Pa., 1972, p. 1069).

To demonstrate that this chemical route can be used to incorporate an element outside of Groups IV, V and VI of the periodic table, a $Bi_2Te_3$/Fe composite was synthesized following the schematics (1) and (2) shown above. Due to the low reduction temperature and subsequent manipulation in air, it is highly probable that the final form of iron in the composite is an oxide such as $Fe_3O_4$.

Figure 2:
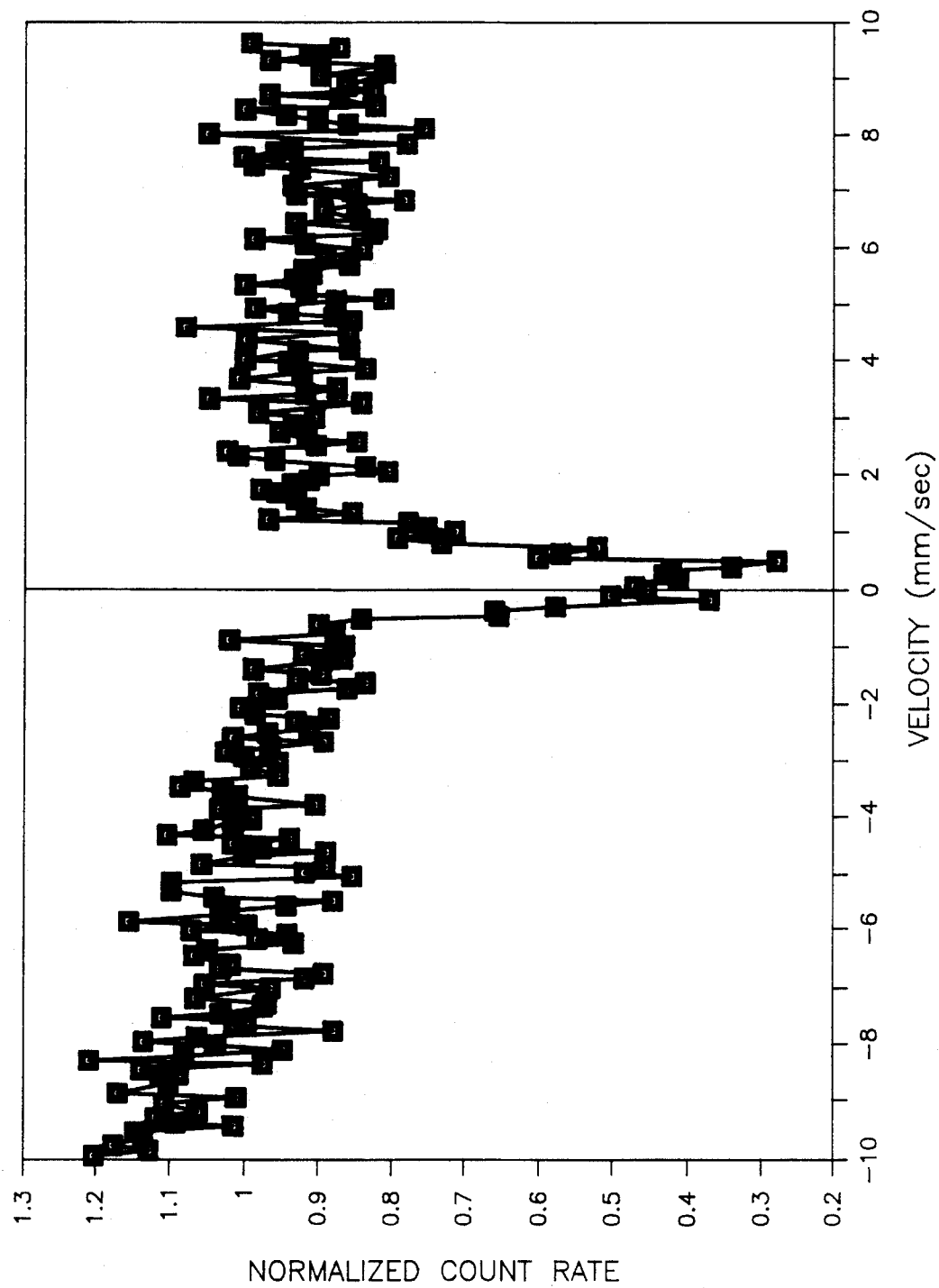
FIG. 2 is a graph showing the Mössbauer Spectrum of a $Bi_2Te_3$/Fe composite produced by the process of this invention.

The cluster size for iron moieties can be estimated readily through mössbauer spectroscopy. The mössbauer spectrum of the $Bi_2Te_3$/Fe composite depicted in FIG. 2 shows a strong central doublet with no magnetic hyperfine splitting. The appearance of this spectrum is typical for a distribution of iron moiety clusters of about 20 nm or smaller in size (see e.g., "Nuclear Resonances in Metals: Nuclear Magnetic Resonance and Mössbauer Effect" I.D. Weisman, L. J. Swartzendruber, and L. H. Bennett, Techniques of Metals Research, 6, Part 2, John Wiley, New York, N.Y. 1973, p. 464–465; "Magnetic Properties of Iron/Silica Gel Nanocomposites", R. D. Shull, J. J. Ritter, A. J. Shapiro, L. J. Swartzendruber, L. H. Bennett, Mater. Res. Soc. Symp. Proc. 132, pp. 179–184, 1989 Materials Research Society).

The co-precipitation method can also be used to incorporate non-conductive, colloidal particulates such as $SiO_2$, in bismuth telluride. This chemical method also can be used to introduce other non-conductive species, or acid-soluble ions other than iron, as nanosized inclusions within a Bi/Te precursor. A bismuth telluride/carbon composite can be synthesized by this method. Depending upon size, oxidation state, coordination preference, etc., these additions can be expected to end up either within the processed $Bi_2Te_3$ lattice, as nanosized particles within $Bi_2Te_3$ grains, or as nanosized second phases in grain boundary regions. Thus, the chemical method of this invention provides means to prepare a wide variety of modified bismuth telluride materials. While a reduction in thermal conductivity is a primary goal, possibilities for improving the other thermoelectric parameters through judicious modifications should not be overlooked.

Thus, the invention includes a novel, simple, aqueous-solution co-precipitation process to produce a bismuth telluride precursor. The precursor is readily converted, such as by reduction in hydrogen, in good yield to nano-particulate (30 to 100 nm) bismuth telluride at 250° C.–275° C. The identification of the product as bismuth telluride is supported by elemental and x-ray analyses as well as by melting point data. This synthesis temperature range is substantially lower than that required in conventional melt processing. In addition, the chemical route has been used to demonstrate the syntheses of a bismuth telluride/iron composite wherein iron species have been incorporated as nanosized clusters, and a bismuth telluride/silica composite with 20 nm silica particulates.

The invention includes prospects for continuous powder production, automated fabrication of thermoelectric elements, and improved structural integrity of such elements, and has the following distinguishing features:

1. Synthesis of nano-particulate $Bi_2Te_3$ at temperatures substantially lower than conventional melt processing.
2. Potential for the inclusion of a variety of non-conductive, nano-particulates; transition metal or rare earth moieties either within the telluride lattice or as nanosized second phases for the purpose of improving or modifying thermoelectric properties.
3. Recent developments indicate that the next generation of thermoelectric cooling devices will be based on quantum well phenomena in multi-layered configurations ("The Effect of Quantum Well structures on the Thermoelectric Figure of Merit", L. D. Hicks and M. S. Dresselhaus, Dept. of Physics, Mass. Inst. of Tech., Oct. 10, 1992, Phys. Rev. B, 47, 1993, pp. 1–13). One fabrication method involves sputter-depositing 1 nm layers of bismuth telluride alternating with thin barrier layers of other materials. Since these ultrathin layers are essentially two-dimensional, control of material homogeneity becomes a critical issue. The chemical processing of the present invention will provide a direct and reliable source of very homogeneous $Bi_2Te_3$ for sputtering targets.
4. The chemical processing route offers the potential to distribute magnetic materials, e.g., iron, cobalt, nickel as well as high-spin rare earth species in a homogeneous fashion within bismuth telluride. With innovative design, it may be possible to improve thermoelectric performance through the hybridization of electro-peltier and magneto-peltier effects ("Bi—Sb Alloys for Magneto-Thermoelectric and Thermomagnetic Cooling", W. M. Yim and A. Amith, RCA Laboratories, Princeton, N.J., Solid State Electronics 15, 1972, pp. 1141–1165), without the use of an external magnet. In these novel systems, the magnetic field would be provided by magnetic species, e.g., iron, "built into" the thermoelectric material during chemical processing.

5. The process of the invention provides fine-particle, polycrystalline bismuth telluride directly and avoids the comminution and classifying steps normally required with melt-processed materials.

The process offers a method of compound synthesis at temperatures some 350° lower than that used in conventional melt processing. In addition, the need for comminution and classifying steps to produce fine-particle, polycrystalline $Bi_2Te_3$, is eliminated.

Utilization of the process of this invention to produce bismuth telluride and bismuth telluride-related materials for use in thermoelectric devices, for example, are shown in the examples hereinbelow.

6. Bismuth trioxide, $Bi_2O_3$, 99.95%, tellurium metal, 99.999+%, Iron(III) nitrate nanohydrate, $Fe(NO_3)_3.9H_2O$, colloidal (20 nm) silica and nitric acid were obtained from commercial sources and used without further purification.

EXAMPLE 1

Synthesis of $Bi_2Te_3$. A typical synthesis for the bismuth telluride precursor is as follows. The bismuth/tellurium solution is prepared by dissolving 0.44 moles of tellurium in 300 ml of 6M (molar) nitric acid with warming to about 60° C. and stirring. Since toxic nitrogen oxides are released during this process it must be performed in an efficient fume hood. After Te dissolution is complete, an amount of bismuth trioxide, $Bi_2O_3$, calculated to give Bi:Te=2:3 is slowly and quantitatively added. The final clear, colorless Bi/Te solution is cooled to 25° C.

A solution consisting of 370 ml concentrated aqueous ammonia and 370 ml distilled water is added dropwise to the Bi/Te solution at 25° C. with rapid stirring. The resultant fine, white precipitate is separated by centrifugation, thoroughly washed with distilled water and dried. The results for chemical analysis of the precursor are as follow: calculated for $Bi_2Te_3O_9.xH_2O$, x=1, Bi, 43.39%; Te, 39.76%. Found, Bi, 43.88; Te, 39.35.

Weighed quantities of the dried precursor powder are heated to 250° C.–275° C. in 0.1 MPa (1 atm) of flowing hydrogen for 3–12 hours. The resultant black powder is confirmed to be bismuth telluride by X-ray powder diffraction (FIG. 1). The overall yield is 92% of that calculated from the amounts of $BiO_3$ and Te used. The powder exhibits a typical equivalent spherical particle size, estimated from B.E.T. (S. Brunauer, P. Emmett & E. Teller, J. Amer. Chem. Soc. 60 309, (1938)) surface area measurements in the 30 to 100 nm range.

Chemical analysis of this material after compaction and sintering in $H_2$ at 400° C. is as follows: calculated for $Bi_2Te_3$, Bi, 52.19%, Te, 47.78%; found Bi, 52.67%, Te, 48.46%.

Differential thermal analysis (DTA) on both commercially obtained and chemically synthesized $Bi_2Te_3$ powders was performed with automated commerical instrumentation, using an alumina reference powder under a $N_2$/5% $H_2$ atmosphere. Both materials exhibited a simple, sharp melting behavior at 582.1° and 582.8 C., respectively.

The $Bi_2Te_3$ powder exhibits a typical equivalent spherical particle size, estimated from B.E.T. measurements, of about 100 nm.

EXAMPLE 2

Synthesis of a $Bi_2Te_3$/Fe Composite. Iron(III) nitrate nanohydrate is added to a Bi/Te solution in an amount to provide a composite with the composition $Bi_2Te_3$/O.1Fe. The metal ions are co-precipitated with aqueous ammonia as described for the Bi/Te system.

The Bi/Te/Fe precursor is reduced in $H_2$ at 250° C. Overall yield is 92% and the particle size estimated from B.E.T. measurements is about 30 nm. A mixture of 9 wt. % of the reduced product in a granular organic polymer is pressed into a 0.8×13 mm disc and used for $^{57}$Fe Mössbauer spectroscopy at room temperature. The resultant spectrum is shown in FIG. 2.

EXAMPLE 3

Synthesis of a $Bi_2Te_3SiO_2$ composite. In a modification of the procedures outlined above, a colloidal silica/ammonia/water solution is added rapidly and with high-shear stirring, to a Bi/Te solution in an amount calculated to give the composition, $Bi_2Te_3$/7 vol % $SiO_2$. After separation, washing and drying as described previously, the recovered, co-precipitated precursor is reduced in hydrogen at 250° C.–275° C.

EXAMPLE 4

Synthesis of a bismuth telluride/6 mol % C composite material. This is an example for the inclusion of nanosized carbon particles in bismuth telluride.

5 nm elemental carbon is dispersed in water containing a few drops of common detergent. The dispersion is combined with a nitric acid solution containing $Bi^{3+}$ and $TeO_3^{2-}$ prepared in the same manner as described in Example 1 above. The bismuth telluride precursor is co-precipitated in the presence of the dispersed carbon particles by the addition of aqueous ammonia. The co-precipitated composite material is washed, dried and reduced with hydrogen at 250° C. as described in the previous examples above.

The foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Therefore, it is to be understood that the invention is not limited to the disclosed embodiments but may be practiced within the full scope of the appended claims.

I claim:

1. A process for producing bismuth telluride comprising the steps of:

dissolving tellurium to form a tellurium first solution;

heating said first solution to approximately 70° C.;

stirring said first solution;

adding an amount of bismuth trioxide to said first solution to produce a second solution wherein the ratio of Bi: Te equals 2:3;

cooling said second solution to approximately 25° C.;

preparing a solution of concentrated aqueous ammonia and distilled water;

adding said solution of concentrated aqueous ammonia and distilled water dropwise to said second solution at approximately 25° C. to form a third solution;

stirring said third solution to produce a precipitate therefrom;

separating said precipitate from said third solution by centrifuging to produce a separated precipitate;

washing said separated precipitate to produce a washed precipitate;

drying said washed precipitate in air to produce a dried precursor powder; and heating said dried precursor powder to 250° C.–275° C.; while exposing said dried precursor powder to flowing hydrogen at 1 atmosphere pressure for a period of 3 to 12 hours to produce a final black powder of bismuth telluride.

2. The process as claimed in claim 1 wherein:

said precursor powder comprises $Bi_2Te_3O_9 \cdot xH_2O$, where $x=1$.

3. The process as claimed in claim 2 wherein:

said precursor powder is formed in accordance with the chemical reaction (1):

  (1)

and said bismuth telluride is formed in accordance with the chemical reaction (2):

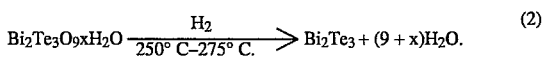  (2)

4. The process as claimed in claim 2 wherein:

said dissolving step to form said tellurium first solution comprises dissolving 0.44 moles of tellurium in 300 ml of 6M nitric acid;

said solution of concentrated aqueous ammonia and distilled water comprises 370 ml concentrated aqueous ammonia and 370 ml distilled water; and said washing comprises washing three times with distilled water.

5. The process as claimed in claim 2 and further comprising:

compacting said bismuth telluride powder to form compacted powder; and sintering said compacted powder in hydrogen at 400° C.

6. The process as claimed in claim 3 and further comprising:

compacting said bismuth telluride powder to form compacted powder; and sintering said compacted powder in hydrogen at 400° C.

7. The process as claimed in claim 4 and further comprising:

compacting said bismuth telluride powder to form compacted powder; and sintering said compacted powder in hydrogen at 400° C.

8. The process as claimed in claim 1 wherein:

said dissolving step to form said tellurium first solution comprises dissolving said tellurium in nitric acid.

* * * * *